United States Patent [19]

Kahleyss et al.

[11] Patent Number: 5,433,949
[45] Date of Patent: Jul. 18, 1995

[54] PROCESS FOR THE PRODUCTION OF NATURAL ANTIOXIDANTS

[75] Inventors: Ralf Kahleyss, Trostberg; Franz Michlbauer, Kirchweidach, both of Germany

[73] Assignee: SKW Trostberg Aktiengesellschaft, Trostberg, Germany

[21] Appl. No.: 29,900

[22] Filed: Mar. 11, 1993

[30] Foreign Application Priority Data

Mar. 11, 1992 [DE] Germany .............. 42 07 739.7

[51] Int. Cl.⁶ .................................. A61K 35/78
[52] U.S. Cl. .................... 424/195.1; 426/425; 426/429; 426/542; 426/654; 426/655
[58] Field of Search ............. 426/542, 644, 655, 425, 426/429; 424/195.1

[56] References Cited

U.S. PATENT DOCUMENTS

| | | | |
|---|---|---|---|
| 3,950,266 | 4/1976 | Chang et al. | 252/398 |
| 4,632,837 | 12/1986 | Schutz et al. | 426/425 |
| 4,638,095 | 1/1987 | Chang et al. | 568/326 |
| 4,741,915 | 5/1988 | Farr et al. | 426/547 |
| 4,946,695 | 8/1990 | Forster et al. | 426/286 |
| 5,017,397 | 5/1991 | Nguyen et al. | 426/542 |
| 5,026,550 | 6/1991 | Aeschbach et al. | 424/195.1 |
| 5,120,558 | 6/1992 | Nguyen et al. | 426/425 |

FOREIGN PATENT DOCUMENTS 0454097 10/1991 European Pat. Off. .

OTHER PUBLICATIONS

Tateo, et al., "Perfumer and Flavorist" 13:48, 1988.
Database WPIL, Week 9214, Derwent Publications Ltd., London, GB; AN 92-110776 & JP-A-4 053 895 & Patent Abstracts of Japan, vol. 016, No. 244 (1992).
Database WPIL, Week 0109, Derwent Publications Ltd., London, GB; AN 91-061468 & JP-A-3 009 984 (Lion Corp.) & Patent Abstracts of Japan vol. 015, No. 126 (1991).
Patent Abstracts of Japan, vol. 016, No. 128 (1992) & JP-A-32 93 001 & Database WPIL, Week 9206, Derwent Publication Ltd., London, GB; AN92-046375.

*Primary Examiner*—Douglas W. Robinson
*Assistant Examiner*—Howard C. Lee
*Attorney, Agent, or Firm*—Felfe & Lynch

[57] ABSTRACT

In order to produce natural antioxidants by extraction of spices selected from the group of rosemary, thyme, sage and origano using compressed carbon dioxide and oreganic solvents a) these spices are de-aromatized by extraction with carbon dioxide at a pressure of 80 to 300 bar and at a temperature of 10° to 80° C., b) the extraction residue obtained from step a) is treated with polar alcoholic solvents with 1 to 4 C atoms and/or non-polar hydrocarbons with 5 to 7 C atoms and c) the solvent extract obtained from step b) is treated with active carbon and d) the extract obtained from step c) is aftertreated with water at a temperature of 40° to 100° C. if desired after extensively removing the solvent.

Antioxidants obtained in this way are almost completely neutral with regard to flavour, odor as well as colour and are more effective than synthetic antioxidants.

13 Claims, No Drawings

PROCESS FOR THE PRODUCTION OF NATURAL ANTIOXIDANTS

The invention concerns a process for the production of natural vegetable antioxidants a particular feature of which is their neutral flavour, odor and colour.

Recently the demand for natural antioxidants for the stabilization of animal and vegetable fats and oils has increased considerably in the food and cosmetics industry since recognizing that synthetic antioxidants such as e.g. BHA (butylhydroxyanisole), BHT (butylhydroxytoluene) as well as TBHQ (tertiary butylhydroquinone) cannot be regarded as toxicologically harmless. Natural antioxidants have been usually isolated from vegetable raw materials whereby extracts of spices and herbs, in particular rosemary, thyme, sage and origano displayed a particularly high antioxidative action.

A major problem in the isolation of these natural vegetable antioxidants is the processing to form an extract which is neutral in flavour, odor and colour since in most areas of application the usual presence of essential oil which has a very intensive flavour and odor is undesired. Apart from steam distillation and molecular distillation, the main conventional method for isolating natural antioxidants from vegetable materials is solvent extraction for which polar extracting agents such as e.g. methanol (cf. U.S. Pat. No. 3,950,266) but also non-polar extracting agents such as hexane or pentane are particular recommended.

A disadvantage of these known methods is the relatively high technical complexity as well as the fact that conventional solvents only have a low selectivity with regard to those vegetable constituents which are particularly effective antioxidants. Hence the extracts obtained in this way do not have such a strongly antioxidative action as the synthetic compounds and in addition are not sufficiently neutral in flavour or odor.

A process is known from U.S. Pat. No. 5,017,397 in which the active antioxidative substances are isolated from spices with the aid of supercritical $CO_2$. For this a total extract is isolated at 350 to 1000 bar, preferably 500 to 1000 bar, and at a temperature of 31° to 120° C. which is subsequently separated again by fractional separation into two fractions comprising the essential oil and the antioxidative substances. A disadvantage of this process is that it has to be carried out at relatively high pressures which can only be realized with extreme difficulty in technical plants and that the exact fractionation of the extract is technically quite difficult and expensive.

Finally it is known from the publication by Tateo and Fellin in "Perfumer and Flavorist" 13:48 (1988) that the majority of the essential oil from ground rosemary leaves can be first extracted with supercritical $CO_2$ at 300 bar and 350° C. and afterwards the antioxidants can be extracted from the extraction residue using ethanol. The extract obtained in this way has a good antioxidative action but is, however, not sufficiently neutral in flavour and colour for many application purposes.

It is therefore the object of the present invention to provide a process for the production of natural vegetable antioxidants by extraction of spices selected from the group of rosemary, thyme, sage and oregano with the aid of compressed carbon dioxide and organic solvents which does not have the disadvantages of the state of the art mentioned above but enables high quality antioxidants to be produced with little technical expenditure.

This object is achieved according to the present invention by a) de-aromatizing the spices by extraction with carbon dioxide at a pressure of 80 to 300 bar and at a temperature of 10° to 800° C., b) extracting the extraction residue obtained from step a) with polar alcoholic solvents having 1 to 4 C atoms and/or non-polar hydrocarbons with 5 to 7 C atoms and c) treating the solvent extract obtained from step b) with active carbon and, d) aftertreating the extract obtained from step c) with water at a temperature of 40° to 100° C., if desired, after extensively removing the solvent.

Surprisingly it turned out that an extract is obtained according to the present invention which is essentially neutral in flavour, odor and colour and which is more effective compared to synthetic antioxidants.

In the process according to the present invention the spices rosemary, thyme, sage or oregano are ground e.g. by milling and in a first step subjected to a $CO_2$ extraction with compressed carbon dioxide in which the extraction parameters can be varied over a wide range. The extraction pressure can be 80 to 300 bar, preferably 150 to 280 bar and the extraction temperature can be 10° to 80° C., preferably 35° to 650° C. The amount of $CO_2$ gas depends on the type and amount of the spice used and is usually 10 to 100 kg, preferably 20 to 60 kg per kg of the respective raw material. By variation of the extraction parameters it is possible to influence the consistency and quality of the aroma fraction obtained in step a). If a relatively high extraction pressure is selected within the stated range then the extract becomes more viscous and still has a substantial antioxidative action while at a lower extraction pressure the aroma fraction is much more fluid and only has a very slight or no further antioxidative action. However, if the aroma fraction is to be used further, which is indeed possible, it is advisable to set a relatively low extraction temperature because of the temperature stress of the essential oil. The separation of the aromatic substances of the respective spice from $CO_2$ can be carried out by the usual methods, preferably by releasing the pressure of the compressed carbon dioxide.

In step b) of the process according to the present invention the extraction residue from step a), which is essentially odorless, is subjected to a further extraction in which either polar alcohols with a $C_1$ to $C_4$ residue and/or non-polar hydrocarbons with a $C_5$ to $C_7$ residue are used. The alcoholic solvents preferably have aliphatic hydrocarbon residues and can be linear or branched. Methanol, ethanol, propanol, isopropanol, isobutanol and tert. butanol are preferred. Methanol is particularly preferred. Of the non-polar hydrocarbons with $C_5$ to $C_7$ residues, the aliphatic ones are likewise preferred. Hexane is particularly preferred, but pentane or heptane can also be used advantageously.

This solvent extraction is preferably carried out with a 5 to 10-fold excess of solvent and at a temperature between 20° and 100° C. In this process a large proportion of the active substances responsible for the antioxidative action is obtained; these are essentially phenolic tricyclic direrpenes. This solvent extraction can be carried out according to known methods and using the usual devices.

Subsequently the extraction solution obtained according to step b) is subjected to a further treatment with active carbon. By this means the colours which are mainly composed of chlorophylls are removed from the extract. The amount of active carbon used in this process depends on the content of colour in the extract and is usually 3 to 10% by weight in relation to the weight of the extraction solution from step b). In principle it is possible to use even larger amounts of active carbon but these very rapidly become uneconomical due to their low technical effect.

The temperature for the active carbon treatment is also relatively uncritical. However, it has proven to be particularly advantageous for to carry out this treatment step at the same temperature as the solvent extraction. This procedure avoids heating or cooling of the extraction solution which would involve a large expenditure of energy. The processing and concentration of the solvent extract does not pose a problem. One can fall back on the known methods and devices.

If necessary, after concentration of the extract a water treatment at a temperature of 40° to 100° C., preferably 50° to 70° C. can follow in which a 5 to 10-fold amount of water is preferably used in relation to the weight of the extract from step c). This aftertreatment step serves to remove residual amounts of colour and aromatic substances but also remaining solvent. This is a particular advantage since extracts can be produced which are almost free of solvent without having to resort to a solvent proportion of <5% during the concentration which would be technically very complicated and cause a temperature-stress of the antioxidant fraction.

Due to the comparatively low technical complexity (even the high pressure extraction is carried out at a relatively low extraction pressure) and the high quality extract which has excellent antioxidative effects and in addition is essentially neutral with regard to flavour, odor and colour, the process according to the present invention is particularly well suited for the technical scale.

The following examples are intended to further elucidate the present invention.

EXAMPLES

EXAMPLE 1

100 kg ground rosemary are extracted within 4 hours at 280 bar and 35° C. with a total of 4000 kg $CO_2$. The extract is separated by lowering the pressure to 40 bar and 8° C. which yields about 7.8 kg of a green paste-like extract. The extraction residue which is virtually free of aroma is subsequently extracted twice with 400 kg methanol for 2 hours in each case at 60° C. The solid components are then removed by filtration. In this way about 700 kg of a dark-green clear extract solution is obtained.

This extract solution is subsequently stirred twice for 30 minutes at 60° C. with 21 kg active carbon in each case and subsequently the active carbon is removed by filtration. The solvent is removed almost completely by distillation until the residual content of methanol is <5% by weight. About 10 kg of an antioxidant fraction is obtained which is washed with a 10-fold amount of water at 60° C. in order to remove bitter substances and residual amounts of solvent.

After drying to a water content of <10% by weight, 7 kg of a light-yellow antioxidant concentrate is obtained which is virtually neutral in odor and flavour.

EXAMPLE 2

100 kg ground rosemary is extracted within 4 hours at 180 bar and 500° C. with a total of 4200 kg $CO_2$. The extract is separated by lowering the pressure to 50 bar and 20° C. in the process of which 3.5 kg of green, slightly paste-like extract is obtained. The extraction residue which is virtually free of aroma is twice extracted with 530 kg methanol for 2 hours in each case at 60° C. and the solids are separated from the extract solution by filtration.

950 kg of a dark-green, clear extract solution is obtained in this way which is subsequently stirred for 1 hour at 60° C. with 57 kg active carbon. After separating the active carbon by filtration the solvent is removed by distillation until the residual content of methanol is no more than 5% by weight. In this way one obtains about 10 kg of an antioxidant fraction which is washed at 50° C. with the 7-fold amount of water in order to remove residual amounts of aromatic substances and solvents.

After drying to <10% by weight, about 7 kg of a yellow coloured antioxidant concentrate which is neutral with regard to flavour and odor is obtained.

EXAMPLE 3

Investigation of the effectiveness of the antioxidants

In a comparative storage test, samples were prepared from lard which was stabilized with a preparation obtained according to the present invention and for comparison with BHA, BHT, octyl gallate or α-tocopherol respectively. Unstabilized lard was used as a further comparison. All samples were stored at 60° C. with free access to atmospheric oxygen (Schaal test). The concentration of the respective antioxidant was adjusted to 200 ppm. A sample of the lard was examined periodically every 2 to 3 days for the content of peroxide (method according to Wheeler) and subjected to a sensory test.

| Peroxide Value (POV) | Days | | | | |
| --- | --- | --- | --- | --- | --- |
| 200 (mg/kg) | 7 | 11 | 23 | 30 | 41 |
| Control (unstab. lard) | 33.0 | 140.0 | 367.0 | 375.0 | 387.0 |
| BHA | 6.0 | 7.9 | 17.0 | 22.0 | 54.0 |
| BHT | 3.3 | 3.3 | 6.5 | 8.0 | 21.0 |
| Octyl gallate | 2.6 | 2.8 | 4.7 | 5.4 | 17.0 |
| α-tocopherol | 14.0 | 24.0 | 361.0 | 384.0 | 387.0 |
| Invention (Example 1) | 2.0 | 2.4 | 4.6 | 6.4 | 9.6 |

It can be seen from the table that, under the conditions used, the preparation according to the present invention increases the storage life of lard by at least 6-fold assuming a sensory "limit" of POV=10. Thus the preparation according to the present invention is more effective than synthetic preparations.

We claim:

1. A process for the production of a natural vegetable ant;oxidant extracted from a spice selected from the group consisting of rosemary, thyme, sage and oregano, said process comprising,
   a) dearomatizing said spice by extracting with carbon dioxide at a pressure of about 80 to about 300 bar and at a temperature of about 10° to about 80° C. to obtain an extraction residue,
   b) treating said extraction residue obtained from step a) with a polar alcoholic solvent having 1 to 4 C atoms or a non-polar hydrocarbon having 5 to 7 C atoms to obtain a first solution extract;

c) treating said first solution extract obtained from step b) with active carbon to obtain a second solution extract and, d) removing solvent from said second solution extract to obtain said natural vegetable antioxidant, e) washing said natural vegetable antioxidant obtained from step d) with water.

2. The process as claimed in claim 1, wherein the $CO_2$ extraction is carried out at a pressure between about 150 and about 280 bar and at a temperature between about 35° and about 65° C.

3. The process as claimed in claim 1, wherein the amount of $CO_2$ gas is about 10 to about 100 kg per kg of the spice used.

4. The process as claimed in claim 1, wherein methanol is said polar alcoholic solvent.

5. The process as claimed in claim 1, wherein hexane is said non-polar hydrocarbon.

6. The process as claimed in claim 1, wherein the solvent in step b) is used in a 5 to 10-fold amount in relation to the extraction residue obtained from step a).

7. The process as claimed in claim 1, wherein step b) is performed at a temperature between about 20° and about 100° C.

8. The process as claimed in claim 1, wherein said active carbon is used in an amount of about 3 to about 10% by weight in relation to the weight of the first solution extract obtained from step b).

9. The process as claimed in claim 1, wherein the treatment with active carbon in step c) is carried out at the same temperature as step d).

10. The process as claimed in claim 1, wherein washing said second solution extract with water occurs at a temperature of 50° to 70° C.

11. The process as claimed in claim 3, wherein the amount of $CO_2$ gas is about 20 to about 60 kg per kg of the spice used.

12. The process as claimed in claim 1, wherein said spice is rosemary.

13. The process as claimed in claim 1, wherein washing said second solution extract with water occurs at a temperature of 40° to 100° C.

* * * * *

UNITED STATES PATENT AND TRADEMARK OFFICE
CERTIFICATE OF CORRECTION

PATENT NO. : 5,433,949
DATED : July 18, 1995
INVENTOR(S) : Kahleyss et al.

It is certified that error appears in the above-indentified patent and that said Letters Patent is hereby corrected as shown below:

| Column | Line | | |
|--------|------|---|---|
| 1 | 55 | should read "35°C" | not "350°C" |
| 2 | 5 | should read "80°C" | not "800°C" |
| 2 | 26 | should read "65°C" | not "650°C" |
| 4 | 3 | should read "50°C" | not "500°C" |

Signed and Sealed this

Seventeenth Day of June, 1997

*Attest:*

BRUCE LEHMAN

*Attesting Officer*   Commissioner of Patents and Trademarks